United States Patent
Kleine

(10) Patent No.: US 8,269,474 B2
(45) Date of Patent: Sep. 18, 2012

(54) SYSTEM AND METHOD FOR REDUCING VOLTAGE OVERSHOOT DURING LOAD RELEASE WITHIN A BUCK REGULATOR

(75) Inventor: John S. Kleine, Cary, NC (US)

(73) Assignee: Intersil Americas Inc, Milpitas, CA (US)

( * ) Notice: Subject to any disclaimer, the term of this patent is extended or adjusted under 35 U.S.C. 154(b) by 683 days.

(21) Appl. No.: 12/506,722

(22) Filed: Jul. 21, 2009

(65) Prior Publication Data

US 2010/0019748 A1    Jan. 28, 2010

Related U.S. Application Data

(60) Provisional application No. 61/083,101, filed on Jul. 23, 2008.

(51) Int. Cl.
*G05F 1/00* (2006.01)

(52) U.S. Cl. .................................. 323/285; 323/223

(58) Field of Classification Search .................. 323/223, 323/282, 284, 285
See application file for complete search history.

(56) References Cited

U.S. PATENT DOCUMENTS 6,724,174 B1 *  4/2004  Esteves et al. ............... 323/224

* cited by examiner

*Primary Examiner* — Harry Behm
*Assistant Examiner* — Matthew Grubb
(74) *Attorney, Agent, or Firm* — Howison & Arnott, L.L.P.

(57) ABSTRACT

A buck regulator comprises an upper switching transistor connected between a voltage input node and a phase node. A lower switching transistor is connected between the phase node and a ground node. An inductor is connected between the phase node and an output voltage node. Circuitry generates control signals to the upper switching transistor and the lower switching transistor responsive to the output voltage and a reference voltage. The control signals to the lower switching transistor selectively turn off the lower switching transistor responsive to a current direction through the lower switching transistor and an indication of whether a voltage error signal has been clamped at a selected level.

16 Claims, 2 Drawing Sheets

SYSTEM AND METHOD FOR REDUCING VOLTAGE OVERSHOOT DURING LOAD RELEASE WITHIN A BUCK REGULATOR

CROSS-REFERENCE TO RELATED APPLICATIONS

This application claims priority from U.S. Provisional Patent Application No. 61/083,101, filed Jul. 23, 2008 and entitled SYSTEM AND METHOD FOR REDUCING VOLTAGE OVERSHOOT DURING LOAD RELEASE WITHIN A BUCK REGULATOR, which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
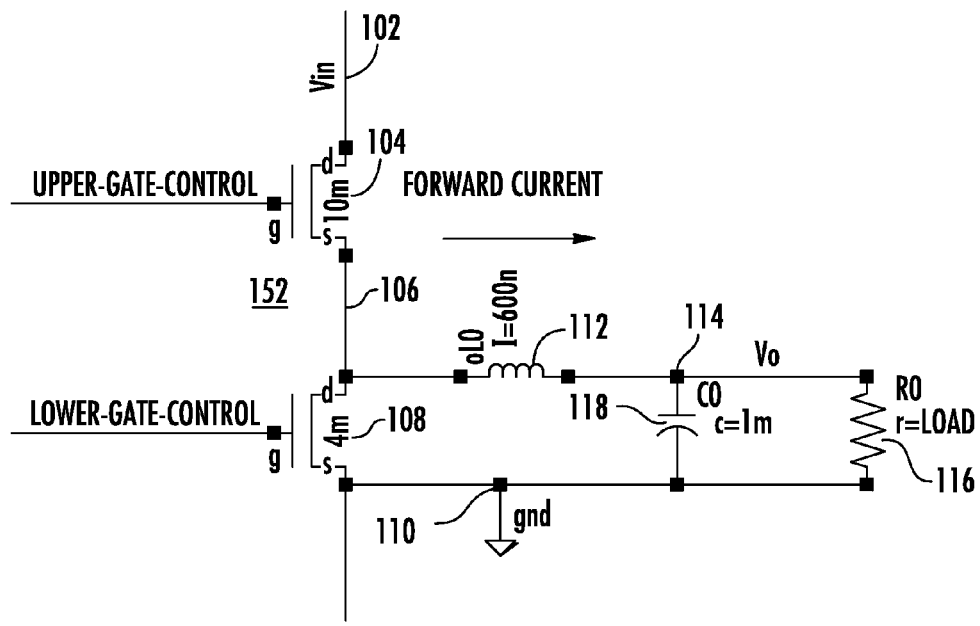
FIG. 1 is a schematic diagram of a buck regulator.

Referring now to the drawings, wherein like reference numbers are used herein to designate like elements throughout, the various views and embodiments of a system and method for reducing voltage overshoot during load release within a buck regulator are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a schematic diagram of a standard buck regulator convention. An input voltage $V_{IN}$ is applied at node 102. An upper gate switching transistor 104 is connected between node 102 and the phase node 106. A lower gate switching transistor 108 is connected between phase node 106 and a ground node 110. An upper gate control signal is applied to the gate of switching transistor 104 and a lower gate control signal is applied to the gate of switching transistor 108. These control signals are provided by control circuitry as will be more fully described herein below. An inductor 112 is connected between the phase node 106 and the output voltage node 114. A load value represented by load resistor 116 is connected between the output voltage node 114 and the ground node 110. An output capacitor 118 is connected between the output voltage node 114 and the ground node 110.

In a typical low duty cycle buck regulator application, the output voltage applied from the output voltage node 114 is much smaller than the input voltage node 102. As a result, the voltage applied across the inductor 112 in the forward direction $(V_{IN}-V_O)$ is relatively large while the voltage in the reverse direction across the inductor 112 is relatively small. The rate of change of the inductor current through inductor 112 is proportional to the applied voltage at the input node 102. Thus, the system is not able to ramp the inductor current to a lower level in a rapid fashion.

When the load current through inductor 112 transitions from a high level to a low level, the inductor current through the inductor 112 must be decreased rapidly. This transition occurs during a load release of a buck regulator. During a period of time when the inductor current is above the load current value, any excess inductor current will continue to positively charge the output capacitor 118 resulting in an output voltage overshoot condition. In order to prevent excessive voltage overshoot, the value of the output capacitor 118 may need to be increased so that it is capable of absorbing the excess energy produced during the time period of the excess inductor current. In typical core regulator notebook designs, the load release overshoot specification requires the addition of output capacitance to the circuitry that results in increased area requirements in the circuit design.

In order to reduce the amount of charge delivered to the output node 114 during a load release when the load resistor 116 is removed from the output of the buck regulator circuit, the inductor current may be more rapidly reduced if the lower switching transistor 108 is turned off. This causes a voltage drop across the body diode of the lower switching transistor 108 and the body diode forward drop results in increased reversed inductor voltage across the inductor 112. This causes a more rapid decrease in the inductor current, delivered charge and voltage overshoot at the output voltage node 114. This technique is referred to as diode braking. The power losses occurring within the buck regulator circuit during diode braking may be substantial. Therefore, the decrease in efficiency may not be acceptable for some types of applications.

Figure 2:
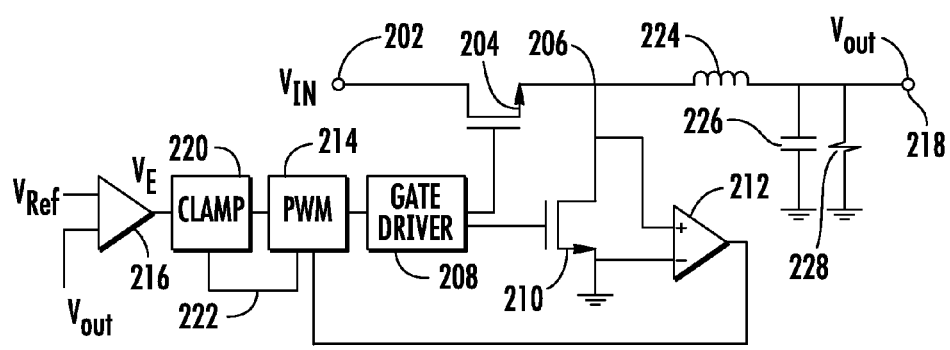
FIG. 2 is a schematic diagram of a buck regulator including the components necessary for reducing voltage overshoot during load release.

Referring now to FIG. 2, there is illustrated a schematic diagram of a buck regulator circuit including the additional components necessary for reducing voltage overshoot during load release within the buck regulator. The input voltage $V_{IN}$ is applied to the input voltage node 202. The input voltage passes through the high-side switching transistor 204 that has its drain/source path connected between the input voltage node 202 and the phase node 206. The gate of the upper gate switching transistor 204 is connected to a gate driver circuit 208. The gate driver circuit 208 generates gate control signals to turn on and off the high-side switching transistor 204 and the lower gate switching transistor 210 responsive to control signals provided from a PWM circuit 214. The low-side switching transistor 210 has its drain/source path connected between the phase node 206 and ground. The inductor 224 is connected between the phase node 206 and the output voltage node 218. The output capacitor 226 is connected between the output voltage node 218 and ground. The output load 228 is also connected between the output voltage node 218 and ground.

In order to control the operation of the lower gate switching transistor 210 based upon the direction of the current through the inductor 224, a comparator 212 is connected across the lower gate switching transistor 210. The non-inverting input of comparator 212 is connected to the phase node 206. The inverting input of the comparator 212 is connected to the source of transistor 210 at the ground node. The comparator 212 monitors the voltage difference between the phase node 206 and the ground node. The state of the comparator 212 indicates the direction of the voltage drop across the lower gate switching transistor 210. The comparator output state provides an indication of the direction of current flow through the low-side switching transistor 210. When the current flows from the phase node 206 to the ground node (a negative inductor current), the output of the comparator 212 will be in a logical "high" state. Likewise, when the current flows from the ground node to the phase node 206 (a positive inductor current), the output of the comparator 212 will be in a logical "low" state.

The output of the phase comparator 212 is provided as a control input to the PWM control circuit 214. The output of the PWM control circuit 214 is provided to the gate driver circuitry 208 as described previously. The PWM control circuit 214 also receives a voltage error input from the clamp circuit 220 and a control input from the clamp circuit 220 via control line 222 providing an indication of when the clamp circuit 220 has been actuated to clamp the output of the error amplifier 216 to a selected level. The PWM control circuit 214 generates control signals to the gate drivers 208 responsive to the information from the phase comparator 212 and responsive to the voltage error signal $V_E$ provided from the error amplifier 216 through the clamp voltage circuit 220.

The error amplifier 216 compares a reference voltage $V_{REF}$ with the output voltage of the buck regulator at the output voltage node 218. The error amplifier 216 generates a voltage error signal $V_E$ responsive to each of these signals showing the difference between the output voltage and the reference voltage. In order to provide a faster loop response and to prevent the error amplifier 216 from saturating, the execution range of the error amplifier output (the COMP pin of the buck regulator) is limited by the clamping circuit 220. The clamping circuit 220 clamps the voltage output of the error amplifier 216 to a predetermined level to prevent the voltage from decreasing to a level that will saturate the output range of the error amplifier 216. An internal signal is generated by the clamping circuit 220 that is provided to the PWM control circuit via line 222 to identify when the error amplifier has reached the clamping voltage level.

To reduce the charge level delivered to the output voltage node 218 and to the output capacitance 226 during a load release condition of the buck regulator, the inductor current through inductor 224 may be released more rapidly if the lower switching transistor 210 is turned off. Turning off the lower gate switching transistor 210 causes a voltage drop across the body diode of the lower gate transistor 210. The body diode forward voltage drop results in an increased reverse inductor current through the inductor 224, and thus causes a more rapid decrease in the inductor current, a decrease in the delivered charge to the output capacitor 226 and a reduction in the voltage overshoot at node 218.

The use of this diode braking technique can result in a reduction of voltage overshoot at output node 218. However, the use of diode braking raises a number of concerns of uncertainty of the efficiency impact at the overall operation of the buck regulator. This diode braking technique may cause substantial power loss within the circuit as described previously. Thus, various criteria must be established to determine when to engage the use of the diode braking method in order to avoid power losses that would not be desirable in certain situations. The most direct method of establishing criteria for engaging the diode braking involves the output state of the comparator 212 and the operation of the clamping circuit 220 as is more fully described herein below.

Figure 3:
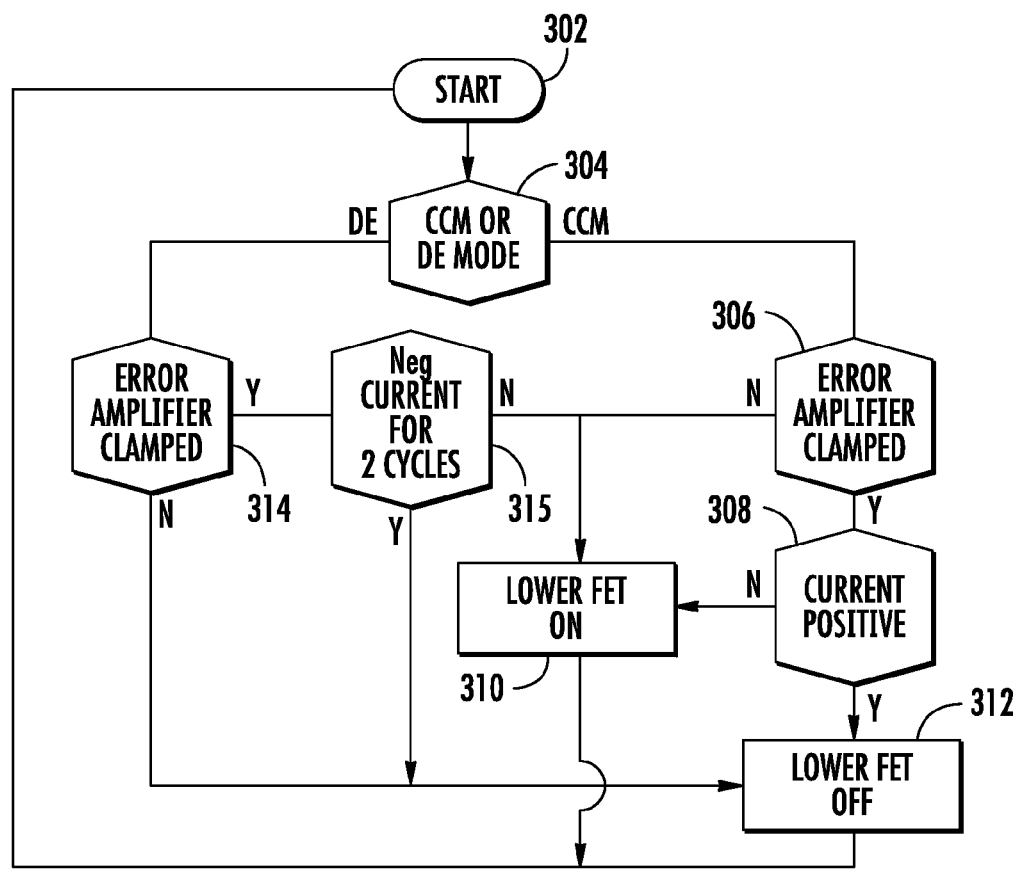
FIG. 3 is a flow diagram describing the process for controlling the operation of the lower switching transistor of the buck regulator of FIG. 2.

Referring now to FIG. 3, there is illustrated a flow diagram describing the process for determining when to turn on and off the lower switching transistor 210 to most efficiently apply the technique of diode braking to the buck regulator circuit. According to the present disclosure, the criteria for turning off the lower switching transistor 210 includes both the status of the error amplifier clamping circuit 220 and the output of the phase comparator 212. The control method differs slightly for cases in which the power supply is operating in a continuous current mode (CCM) of operation or in a diode emulation mode (DE) of operation.

Once the control process is initiated at step 302, inquiry step 304 determines whether the power supply is operating in a continuous current mode of operation or a diode emulation mode of operation. If the circuit is operating in the continuous current mode of operation, inquiry step 306 determines whether the error amplifier has its output error voltage signal $V_E$ clamped by the clamping circuit 220. If the output of the error amplifier is clamped, control passes to inquiry step 308 wherein a determination is made of whether the current passing through the lower switching transistor 210 is moving in the positive current direction (i.e., from the ground toward phase node). If the current is moving in the positive direction, both conditions necessary for turning off the lower switching transistor have been met and the lower switching transistor is turned off at step 312. If inquiry step 306 determines that the error amplifier output error voltage $V_E$ has not been clamped or if inquiry step 308 determines that the current through the lower switching transistor 210 is not moving in the positive direction (i.e., is moving from phase node to ground), control passes to step 310 and the lower switching transistor remains in the on state.

If inquiry step 304 determines that the power supply is operating in the diode emulation mode of operation, control passes to inquiry step 314 to determine if the error amplifier output voltage $V_E$ is being clamped by the clamping circuitry 220. If the output voltage $V_E$ is not being clamped, the lower switching transistor is placed in the off state at step 312. If the error amplifier output voltage $V_E$ is being clamped, inquiry step 315 determines if the current has been negative for the previous two cycles. If so, the lower switching transistor 210 is placed in the off state at step 312. If not, the lower FET remains in the on state at step 310. Once a determination of the on state or the off state of the switching transistor has been made at one of steps 310 or 312, the process will then repeat itself to make a further determination of whether the lower transistor 210 remains on or off by repeating the above control process.

While in the continuous current mode of operation, the diode braking function turns off the lower switching transistor 210 only when both the error amplifier output voltage $V_E$ is clamped, as determined at inquiry step 306, and the phase comparator 212 indicates that the current through the lower switching transistor 210 is in the positive direction. During the continuous current mode, the signal levels will not cause the error amplifier output to be clamped except during significant load releases or rapid reference voltage changes. Once the inductor current reverses, the lower FET will be turned on because the phase comparator status will indicate a reverse current condition has occurred through the lower switching transistor 210. This ensures that the negative current may freely flow, allowing charge to be removed from the output capacitor 226 and reduce the duration of the voltage overshoot condition. While in the diode emulation mode of operation, reverse current through the switching transistor 210 is not normally allowed. Therefore, the lower switching transistor 210 will be turned off regardless of the current direction as long as negative current existed in the previous 2-cycles (i.e., the status of the phase comparator 212) and is based solely upon the condition of the error amplifier clamp status. If no negative current existed, the lower transistor will remain on.

The above described configuration and method of operation has several advantages over existing buck regulator applications. The error amplifier output has built in behaviors such as differential sensing, current information, filtering and is generally tunable at the application level. A simple output voltage comparator will generally not contain these features and will not be readily adjustable. The reference level used to toggle the lower gate off function may be independently adjusted from the normal ramp modulation scheme, and may be changed based upon the operating mode whether it be continuous current mode or diode emulation mode. The use of the phase comparator 212 also allows the inductor 224 to conduct negative current during load release events. This is advantageous because the excess capacitor charge may be recovered by the battery, resulting in improved system efficiency. Thus, for a synchronous buck converter, the amount of output capacitance required to achieve a particular overshoot specification may be reduced using the above described circuitry as the result of less energy being delivered to the output voltage node during a load release event.

It will be appreciated by those skilled in the art having the benefit of this disclosure that this system and method for reducing voltage overshoot during load release within a buck regulator by controlling the on and off state of a lower switching transistor. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A buck regulator comprising:
   an upper switching transistor connected between a voltage input node and a phase node;
   a lower switching transistor connected between the phase node and a ground node;
   an inductor connected between the phase node and an output voltage node;
   a capacitor connected between the output voltage node and ground; and
   circuitry for generating control signals to the upper switching transistor and the lower switching transistor responsive to the output voltage and a reference voltage, wherein the control signal to the lower switching transistor selectively turns off the lower switching transistor responsive to a current direction through the lower switching transistor and an indication whether a voltage error signal has been clamped at a selected level, wherein the circuitry turns off the lower switching transistor responsive to an indication that the voltage error signal has been clamped at the selected level and detection of a positive inductor current through the lower switching transistor in a continuous current mode of operation.

2. The buck regulator of claim 1, wherein the circuitry further comprises:
   a gate driver circuit for generating the control signals to the upper switching transistor and the lower switching transistor responsive to a PWM control signal;
   an error amplifier for generating the voltage error signal responsive to the output voltage and the reference voltage;
   a clamping circuit for clamping the voltage error signal at the selected level, preventing it from falling below the selected level, and generating the clamping indication when clamping the voltage error signal at the selected level; and
   a PWM controller for generating the PWM control signal responsive to the current direction through the lower switching transistor, the voltage error signal and the clamping indication.

3. The buck regulator of claim 1, wherein the circuitry further comprises:
   a comparator for determining the current direction through the lower switching transistor, the comparator having a first input connected to the phase node and a second input connected to the ground node; and
   a clamping circuit for generating the clamping indication that the voltage error signal has been clamped at the selected level.

4. The buck regulator of claim 1, wherein the circuitry turns on the lower switching transistor responsive to an indication that the voltage error signal has been clamped at the selected level and detection of negative inductor current through the lower switching transistor in a continuous current mode of operation.

5. The buck regulator of claim 1, wherein the circuitry turns on the lower switching transistor responsive to an indication that the voltage error signal has not been clamped at the selected level in a continuous current mode of operation.

6. The buck regulator of claim 1, wherein the circuitry turns off the lower switching transistor responsive to an indication that the voltage error signal has been clamped in a diode emulation mode of operation.

7. The buck regulator of claim 1, wherein the circuitry turns on the lower switching transistor responsive to an indication that the voltage error signal has not been clamped in a diode emulation mode of operation.

8. A buck regulator comprising:
   an upper switching transistor connected between a voltage input node and a phase node;
   a lower switching transistor connected between the phase node and a ground node;
   an inductor between the phase node and an output voltage node;
   a capacitor connected between the output voltage node and ground;
   a gate driver circuit for generating the control signals to the upper switching transistor and the lower switching transistor responsive to a PWM control signal;
   an error amplifier for generating a voltage error signal responsive to an output voltage and a reference voltage;
   a clamping circuit for clamping the voltage error signal at a selected level, preventing it from falling below the selected level, and generating a clamping indication when clamping the voltage error signal at the selected level;
   a comparator for determining a current direction through the lower switching transistor, the comparator having a first input connected to the phase node and a second input connected to the ground node;
   a PWM controller for generating the PWM control signal responsive to the current direction through the lower switching transistor, the voltage error signal and the clamping indication;
   wherein the PWM control signal causes the control signal to the lower switching transistor to selectively turn off the lower switching transistor responsive to the current direction through the lower switching transistor and the clamping indication; and wherein the PWM control signal causes the control signal to the lower switching transistor to turn on the lower switching transistor responsive to an indication that the voltage error signal has been clamped at the selected level and detection of negative inductor current through the lower switching transistor in a continuous current mode of operation.

9. The buck regulator of claim 8, wherein the PWM control signal causes the control signal to the lower switching transistor to turn off the lower switching transistor responsive to an indication that the voltage error signal has been clamped at the selected level and detection of a positive inductor current through the lower switching transistor in a continuous current mode of operation.

10. The buck regulator of claim 8, wherein the PWM control signal causes the control signal to the lower switching transistor to turn on the lower switching transistor responsive to an indication that the voltage error signal has not been clamped at the selected level in a continuous current mode of operation.

11. The buck regulator of claim 8, wherein the PWM control signal causes the control signal to the lower switching transistor to turn off the lower switching transistor responsive to an indication that the voltage error signal has been clamped in a diode emulation mode of operation.

12. The buck regulator of claim 8, wherein the PWM control signal causes the control signal to the lower switching transistor to turn on the lower switching transistor responsive to an indication that the voltage error signal has not been clamped in a diode emulation mode of operation.

13. A method for controlling a lower switching transistor of a buck voltage regulator, comprising the steps of:
 determining whether the buck regulator is operating in a continuous current mode of operation or a diode emulation mode of operation;
 if the buck regulator is operating in the diode emulation mode of operation, controlling a state of the lower switching transistor responsive to whether an output of an error amplifier is being clamped to a selected level;
 if the buck regulator is operating in the continuous current mode of operation, controlling the state of the lower switching transistor responsive to whether the output of the error amplifier is being clamped to the selected level and a current through the lower switching transistor is in a positive direction, wherein the step of controlling in the continuous current mode further comprises the steps of:
  determining whether the output of the error amplifier is being clamped to the selected level;
  determining whether the current through the lower switching transistor is flowing in a positive direction;
  maintaining the lower switching transistor in an off state if the output of the error amplifier is being clamped to the selected level and the current through the lower switching transistor is flowing in the positive direction; and
  maintaining the lower switching transistor in an on state if the output of the error amplifier in not being clamped to the selected level or if the current through the lower switching transistor is not flowing in the positive direction.

14. The method of claim 13, wherein the step of controlling in the diode emulation mode further comprises the steps of:
 determining whether the output of the error amplifier is being clamped to the selected level;
 maintaining the lower switching transistor in an off state if the output of the error amplifier is being clamped to the selected level; and
 maintaining the lower switching transistor in an on state if the output of the error amplifier is not being clamped to the selected level when the high side switching transistor is OFF and the inductor current is positive.

15. The method of claim 13, wherein the step of determining whether the output of the error amplifier is being clamped further comprises the steps of:
 generating a first indication if the output of the error amplifier is being clamped; and
 generating a second indication if the output of the error amplifier is not being clamped.

16. The method of claim 13, wherein the step of determining the current further comprises the step of:
 comparing a voltage on a first side of the lower switching transistor with a second voltage on a second side of the lower switching transistor; and
 generating a first output from the comparator responsive to a determination of the current moving in a positive direction through the lower switching transistor; and
 generating a second output from the comparator responsive to a determination of the current moving in a negative direction through the lower switching transistors.

* * * * *